Figure 1:
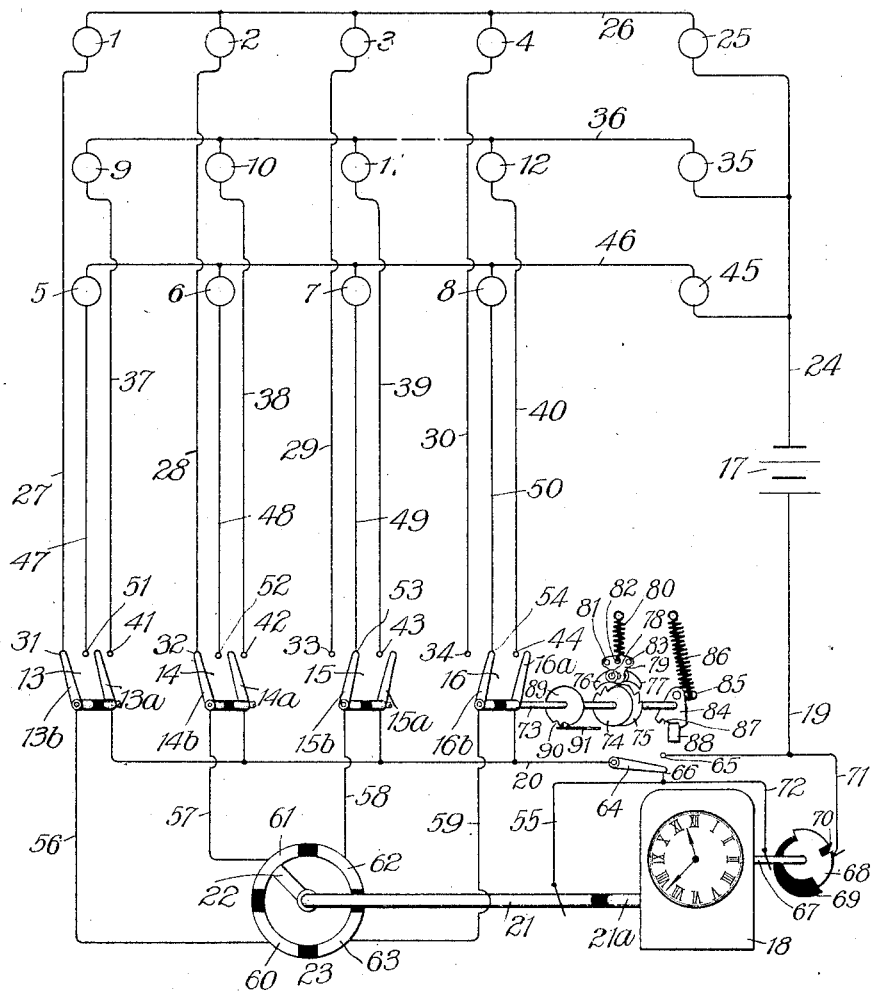

W. J. CRUMPTON.
ACCOUNTING SYSTEM.
APPLICATION FILED MAY 17, 1909.

1,088,327.

Patented Feb. 24, 1914.
2 SHEETS—SHEET 2.

Witnesses

Inventor
William L. Crumpton
By Brown William
Attorneys

UNITED STATES PATENT OFFICE.

WILLIAM J. CRUMPTON, OF EVANSTON, ILLINOIS, ASSIGNOR, BY MESNE ASSIGNMENTS, TO WILLIAM R. HEATH, OF BUFFALO, NEW YORK.

ACCOUNTING SYSTEM.

1,088,327.  Specification of Letters Patent.  Patented Feb. 24, 1914.

Application filed May 17, 1909. Serial No. 496,615.

*To all whom it may concern:*

Be it known that I, WILLIAM J. CRUMPTON, a citizen of the United States, residing at Evanston, in the county of Cook and State of Illinois, have invented a certain new and useful Improvement in Accounting Systems, of which the following is a full, clear, concise, and exact description, reference being had to the accompanying drawings, forming a part of this specification.

My invention relates to an improved system of accounting in which the registering mechanism is adapted to be actuated by suitable driving means, such registering mechanism being adapted to be connected to or disconnected from the driving means as desired. In this system I provide registering means for determining the duration of the "in" registrations, the duration of the "out" registrations, and for indicating the number of such registrations, either combined or classified, as desired. These elements may be embodied and operated either separately or in combination.

My invention consists broadly in means for registering the number of effective connections or disconnections or both of a register to or from the actuating mechanism; the number of such connections or disconnections or both during predetermined intervals, regardless of the total number of such connections or disconnections; and in combination with the lateral means for registering the total of such connections and disconnections.

In the embodiment of my invention shown herein, I employ a first registering mechanism for indicating the working time to be credited to a workman during one of the operating intervals during which the workman is employed. In connection with this working time register, I employ a second register adapted to indicate the waste time to be charged to the workman during the same operative intervals. In connection with the working time register and the waste register, I employ a driving means operative during predetermined intervals to actuate one register or the other, depending upon which is connected to such driving means, and I further provide a counter or register for such time registers for indicating the number of connections to or disconnections from the driving means during the operative periods.

In carrying out my invention, it is desirable to employ a plurality of register arrangements indicated above, one for each workman, and in order to indicate the total time to be credited to the workman, the total waste time and the total number of connections to or disconnections from the driving mechanism during the operative intervals, I employ totalizing registers, one of which is used in connection with the working time registers, another in connection with the waste registers, and a third in connection with the counters or indicators, as a result of which the totals mentioned above may be registered.

In the embodiment of my invention shown in the accompanying drawings and described below, I make use of electrically operated registers and clockwork for controlling suitable driving means for imparting impulses periodically to the registers to effect their proper operation. It is to be understood, however, that this is but one embodiment of my invention, which consists broadly in mechanism for accomplishing the results indicated above.

Figure 2:
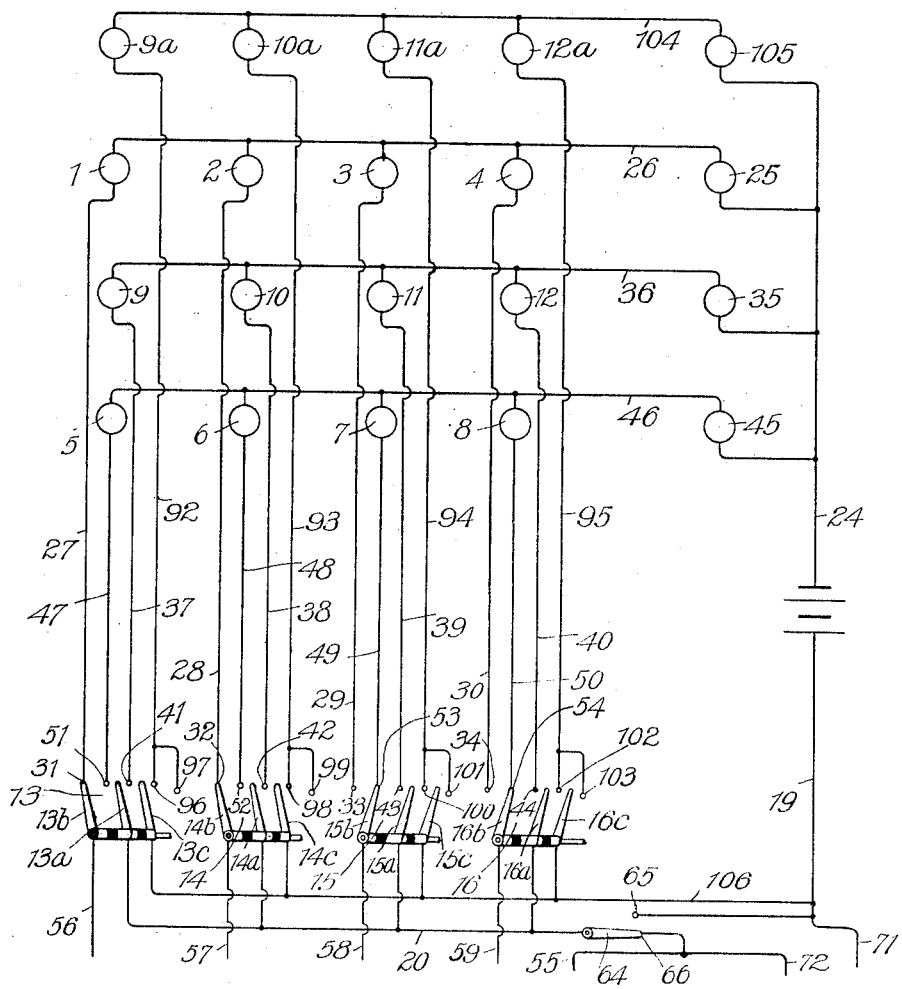

The several drawings illustrating my invention are as follows:

Figure 1 is a diagrammatic view in which the mechanism employed for accomplishing the results indicated above are shown adapted to control electric circuits extending to suitable registers for indicating the values desired; Fig. 2 shows in a diagrammatic view similar to Fig. 1 a modified arrangement of circuits and register mechanism for indicating the total number of actuations of the register connecting means, as well as the number of such actuations during predetermined intervals.

As shown in Fig. 1 of the drawings, 1, 2, 3, 4 represent a plurality of workmen's registers, each of which is assigned to a different workman. Waste registers 5, 6, 7, 8 are associated with the four workmen's registers mentioned, to indicate the amount of waste labor that may be charged to the corresponding workmen. Counters or indicators 9, 10, 11, 12 are associated respectively with the workmen's registers 1, 2, 3 and 4 to indicate the number of times that the workmen's registers or the waste registers are connected to or disconnected from the driving mechanism during certain predetermined periods, or working hours. Switches 13, 14, 15, 16 are associated respectively with the workmen's registers 1, 2, 3 and 4 to close or open the operating circuit of any register as desired.

I find it desirable in carrying out my invention to employ time-controlled mechanism for operatively connecting the switches 13, 14, 15 and 16 with a source of electric energy 17 during the working periods of the shop or factory in which the system is used. As shown in the drawing, this mechanism is indicated diagrammatically by a clock 18, which is adapted by means of mechanism contained therein to electrically connect wires 19 and 20 during these intervals and to break connection between these wires during the non-working intervals of the shop or factory. The clock 18 is adapted to drive a shaft 67, to which is secured a cam-shaped contact disk 68. This disk 68 is so conformed around its periphery and so provided with insulating members 69 and 70 that the brush 71, which is connected to the wire 19, is in contact with the conducting portion 68 of the disk during predetermined intervals which may be the working intervals or periods in the shop in which the system is in use. The circuit closed in part by the brush 71 and disk 68 is continued through the shaft 67, wire 72, wire 55, shaft 21 and brush 22 to the commutator 23, by which current impulses are distributed to the several registers to be actuated, in a manner to be described. It is apparent that the disk 68 may be conformed in any desired manner so as to secure any desired intervals of operative condition, and that the arrangement is adapted for use under any circumstances where it is desirable to secure operative periods of electric circuits alternative with inoperative periods. As shown in Fig. 1, the disk 68 is designed to afford two operative periods separated by a short inoperative period caused by the insulating member 70, the operative periods corresponding with the morning and afternoon working periods in a shop or factory. The clock 18, in addition to accomplishing the result indicated, also serves to drive a shaft 21 at such a rate that the brush 22 carried thereby will make contact with one of the segments of the commutator 23 at recurring intervals, such as to operate either the workmen's registers or the waste registers at a rate to indicate the length of time that they are operatively connected to such commutator. The circuit connections employed for accomplishing these results are as follows: Beginning at battery 17, a circuit may be traced through wire 24, totalizing register 25, wire 26, and thence through the working time registers 1, 2, 3 and 4 in parallel by wires 27, 28, 29, 30, to contacts 31, 32, 33, 34 of switches 13, 14, 15 and 16, respectively. A second path from the battery 17 may be traced through wire 24, totalizing register 35, wire 36, and thence in parallel through the counters or indicators 9, 10, 11 and 12, by wires 37, 38, 39 and 40, to contacts 41, 42, 43 and 44 of switches 13, 14, 15 and 16, respectively. A third path from the battery 17 may be traced through wire 24, totalizing register 45, wire 46, and thence through waste registers 5, 6, 7 and 8 by wires 47, 48, 49 and 50 to contacts 51, 52, 53 and 54 of switches 13, 14, 15 and 16, respectively. The totalizing registers 25, 35 and 45 are employed for indicating the total working time, the total number of actuations of the switches 13, 14, 15 and 16 during working hours, and the total waste time. The other terminal of the battery 17 is connected by the wire 19 with the switching mechanism contained in the clock 18. The wire 20 is connected to the pivotal points of the switch blades $13^a$, $14^a$, $15^a$, $16^a$ of the switches 13, 14, 15 and 16, respectively. The wire 20 is also connected through switch 64 by a wire 55 with the shaft 21, which, as indicated, is rigidly connected to, but insulated from, the shaft $21^a$ connected with the clock mechanism. The pivotal points of the switch blades $13^b$, $14^b$, $15^b$, $16^b$ of the switches 13, 14, 15 and 16 are connected by wires 56, 57, 58 and 59 with the contacts 60, 61, 62 and 63 of the commutator 23.

The operation of the system described above is as follows: The clock 18 is adjusted so as to connect the wires 19 and 20 in the morning when work in the shop or factory begins, for instance, at seven o'clock. This connection continues uninterrupted until the noon hour, say, twelve o'clock, and is broken until work is resumed in the afternoon, say, at one o'clock. From this time, the connection between the wires 19 and 20 is maintained until the end of the afternoon working period, say, six o'clock, at which time the connection is broken and remains broken until work begins on the next day. When each workman leaves the shop he is required to move his switch 13, 14, 15 or 16, as the case may be, from its "in" position to its "out" position, thus indicating that he has left the factory. In the further consideration of the operation of the system, reference will be made particularly to the workman to whom switch 13 is assigned, since the operation of the other switches is identical in its detail with the operation of the switch 13.

When the switch 13 is in its "out" position, the switch blade $13^b$ rests upon the contact 51, and the blade 13ª occupies a position to the right of the contact 41, and if the switch 13 is moved to this position after six o'clock, no operation of the waste-register 5 connected to such contact 51 results, because the circuit from the battery 17 is interrupted in the clock 18. In the regular course of events the workman will enter the shop in the morning before seven o'clock, and upon entering is required to move the switch 13 from its "out" position to its "in" position, which moves the switch blade 13ᵇ from contact 51 to contact 31, and the switch blade 13ª from its position to the right of contact 41 to a position between contact 41 and 51, during which motion the contact 41 is engaged momentarily. No actuation of the registers or counter results, however, since the wires 19 and 20 are not connected together by the clock 18 until seven o'clock, at which time a circuit is closed as follows: battery 17, wire 19, through the switch mechanism in the clock 18, wire 20, wire 55, shaft 21, brush 22, segment 60, wire 56, switch blade 13ᵇ, contact 31, wire 27, register 1, wire 26, register 25, wire 24, back to battery 17. From this it follows that the register 1 is operated by the successive impulses communicated to the segment 60, which operation continues until twelve o'clock, assuming that the workman puts in his full time. The same operation continues for each succeeding operative period, as a result of which the register 1 will indicate the totals of the operative periods during which the workman has been employed. If, however, instead of arriving at the factory before seven o'clock, as he ought to do, the workman is late, the clock 18 makes connection between the wires 19 and 20 before the switch 13 is moved from its "out" position to its "in" position, as a result of which the following circuit is closed: battery 17, wire 19, switch mechanism in the clock 18, switch 64, wire 20, wire 55, shaft 21, brush 22, segment 60, wire 56, switch blade 13ᵇ, contact 51, wire 47, waste-register 5, wire 46, register 45, wire 24, back to battery 17. As a result of the circuit thus established, beginning at seven o'clock current impulses are communicated to the waste-register 5 at such a rate as to indicate the amount of waste time to be charged against the workman, which operation continues until he arrives and moves the switch 13 from its "out" position to its "in" position. This motion interrupts the operating circuit traced above through the working time register 1, from which it follows that the total working period for each day will be registered in either the register 5 or the register 1, so that the sum of the indications of these registers will equal in amount the working period for the day.

When the switch 13 is moved from its "out" position to its "in" position, a circuit is closed momentarily by the switch blade 13ª as follows: battery 17, wire 19, through the switch mechanism closed by the clock 18, switch 64, wire 20, switch blade 13ª, contact 41, wire 37, counter 9, wire 36, register 35, wire 24, back to the battery 17. A single impulse is, therefore, sent through the operating mechanism of the indicator or counter 9, as a result of which it is advanced one step. This counter, therefore, serves to indicate the number of times that a workman enters or leaves the factory during working hours.

The operation of the switches 14, 15 and 16 is the same in each instance as already described for the switch 13, and it is not thought that a detailed description of the operation of these switches is, therefore, necessary. It is to be noted that the impulses sent through the working time registers 1, 2, 3 and 4 when the corresponding workmen are all in the factory are displaced relatively to each other by means of commutator 23, as a result of which the current impulses flowing through the total working time register 25 will equal the sum of the impulses flowing through the registers 1, 2, 3 and 4, and the register 25 will, therefore, indicate the total operation of such registers 1, 2, 3 and 4. The same is true of the operation of the waste registers 5, 6, 7 and 8 and the totalizing register used to indicate the total operation of such waste registers. The registers 9, 10, 11 and 12, therefore, serve to indicate the number of delinquencies on the part of the several workmen and may be used as a basis for assessing penalties, if desired.

In the arrangement shown in Fig. 1, means are provided whereby the workman is caused to operate his switch in a desired manner, either to indicate all of his delinquencies or only the number of times he leaves before he ought to, or the number of times he arrives after he ought to, as desired. This mechanism is shown in connection with switch 16, and it is to be understood that similar mechanism is used in connection with each of the other switches. The switch arms or blades 16ª and 16ᵇ are mounted upon a shaft 73 in different planes, the switch blade 16ª being shown back of and insulated from the switch blade 16ᵇ. The shaft 73 has secured thereto two ratchet wheels 74 and 75 disposed in different planes, and adapted to be engaged by pawls 76 and 77 rigidly carried by a shaft 78 to which an adjusting member 79 is secured. A spring 80 is provided, which is adapted to engage the member 79 in the hole 81, 82 or 83, as desired, the effect of these engagements being to throw the pawl 77 into engagement with the ratchet wheel 75, to disengage both pawls from their ratchet wheels, or to throw the pawl 76 into engagement with the ratchet wheel 74, as the case may be. The effect of placing the lower end of the spring 80 in the hole 81 is to cause clockwise rotation of the switch 16 whenever it is actuated, as a result of which when the workman moves the switch from its working to its waste position, the switch blade 16ª engages the contact 44 and actuates the counter 12. When the switch 16 is in this position, the pawl 77 engages the ratchet wheel 75, and the workman can only move the switch 16 to its working position by moving it in a clockwise direction until such engagement is effected, the pawl 77 at this time preventing counter clockwise rotation of the switch 16. For this arrangement of the spring 80, the switch blade 16ª will not engage the contact 44 when the switch 16 is moved from its waste position to its working position, whether this operation of the switch 16 is effected during an operative interval or not.

When the spring 80 is secured in the opening 83, the switch 16 can only be moved in a counter clockwise direction when it is actuated, as a result of which when the workman moves the switch 16 from connection with the waste register to the working register, the switch blade 16ª engages the contact 44 and the counter 12 is actuated. At this time, the pawl 76 by its engagement with the ratchet wheel 74 prevents clockwise rotation of the switch 16 and when the workman desires to move the switch 16 from the working register to the waste register, it must be moved in a counter clockwise direction for which motion the switch blade 16ª does not engage the contact 44. This results in registering for this condition of the spring 80 only the number of times that the workman is late in arriving, since the counter 12 is not operated when the switch 16 is moved from the working position to the waste position.

It is to be noticed that the ratchet wheels 74 and 75 are provided with teeth at but certain portions of their peripheries. This construction is resorted to since it is only necessary to engage the ratchet wheels while the switch blade 16ᵇ is either on contact 34 or 54. Means are provided in connection with the shaft 73 to always bring the switch blade 16ᵇ into engagement either with the contact 34 or 54, assuming that it has not been properly actuated by the workman. This means consists in a crank 84 secured to the shaft 73, which is adapted by means of a pin 85 carried thereby to engage one end of a spring 86. The crank 84 is extended from the shaft in a direction opposite to the location of the pin 85, and has formed in it a recess 87 adapted to be engaged by a movable stop 88. When the spring 80 is attached either in the hole 81 or 83 of the member 79, the stop 88 is moved clear of the crank member 84, so as to permit its continuous rotation. If now, when the switch 16 is operated, it is not moved sufficiently far to cause the pin 85 to pass the lower dead center, the spring 86 will return the switch 16 when it is released so as to cause the switch blade 16ᵇ to engage the contact with which it was last in engagement, in which position the pawl at this time operated will engage its corresponding ratchet wheel. If, on the other hand, the switch 16 is moved far enough to just pass the lower dead center, the spring 86 will then cause continued motion of the switch 16 in the same direction, and cause the engagement of the switch blade 16ᵇ with the other contact than the one with which it was last in engagement. A disk 89 is secured to the shaft 73, such disk being provided with notches 90 with which a spring detent 91 is adapted to engage when the switch blade 16ᵇ is upon either of its contacts 34 or 54. This notched disk 89 and spring detent 91 are provided to prevent overthrow of the switch 16 when the spring 86 by its operation causes such switch to continue and complete its motion. When the spring 80 is in engagement with the hole 82 in the member 79, the stop 88 is moved into the recess 87 formed in the crank member 84, as a result of which the angular motion of the shaft 73 is limited, just being sufficient for this condition so that the switch 16 may be moved reciprocally to bring the switch blade 16ᵇ into engagement with the contacts 34 or 54, as desired. For this arrangement, the switch blade 16ª will engage the contact 44 for each operation of the switch 16. It is to be understood that the mechanism carried by the shaft 73 and coöperating therewith is not accessible to the workman, but is provided in order that the workman's superiors may establish any condition of the registering system that they may desire. That is, they may desire to learn the total number of early "out" registrations for each workman; or, under other circumstances, they may desire to know the total number of late "in" registrations; or under other circumstances they may desire to know the total number of both early "out" registrations and late "in" registrations.

If it is desired to register the total number of actuations of the switch 16, instead of the number of actuations during predetermined intervals, the switch 64 is moved from the contact 66 to the contact 65, in which position the switch blade 16ª is permanently connected with the battery 17 through the wires 19 and 20. For this arrangement, therefore, the counter 12 will serve to indicate the total number of actuations of the switch 16 to connect with the waste register, the total number of actuations to connect with the working register, or the total number of actuations to connect with both registers, according as the spring 80 is in engagement with the hole 81, 83 or 82.

The arrangement shown in Fig. 2 is similar to the arrangement shown in Fig. 1, there being provided in Fig. 2 in addition to the apparatus shown in Fig. 1 an extra counter associated with each workman's switch. These counters are indicated at 9ª, 10ª, 11,ª 12ª, one terminal of the actuating mechanism of each register being connected by wires 92, 93, 94, 95 with the contacts 96—97, 98—99, 100—101, 102—103 adapted to be engaged by switch blades 13ᶜ, 14ᶜ, 15ᶜ and 16ᶜ of the switches 13, 14, 15 and 16 respectively. The other terminals of the counters 9ª, 10ª, 11ª, 12ª are connected together and to the totalizing register 105 by wire 104, the other terminal of the totalizing register 105 being connected by wire 24 with battery 17. The pivotal points of the switch blades 13ᶜ, 14ᶜ, 15ᶜ, 16ᶜ are connected together and are permanently connected by wire 106 with the wire 19.

As a result of the circuit arrangements described, it is apparent that the counters 9ª, 10ª, 11ª, 12ª are adapted to indicate the total number of actuations of the switches 13, 14, 15, 16 respectively and that at the same time the controlling mechanism described in connection with each switch may be adjusted to secure any desired registration on the counters 9, 10, 11 and 12.

While I have shown my invention in the particular embodiments herein described, I do not, however, limit myself to this arrangement, but desire to secure any equivalent modification that will suggest itself to those skilled in the art.

What I claim is:

1. In an accounting system, the combination of a register, a counter, means for driving such register, means for operatively associating such driving means with the register only during predetermined intervals, and means for connecting such register to the driving means, such counter adapted to indicate the number of actuations of the connecting means during such intervals.

2. In an accounting system, the combination of a register, a counter, means for driving such register, means for operatively associating such driving means with the register during predetermined intervals, and means for connecting such register to the driving means, such counter adapted to indicate the number of actuations of the connecting means during such intervals, actuation of the connecting means outside of such predetermined intervals having no effect upon such counter.

3. In an accounting system, the combination of a working register, a waste register, a counter, means for driving such registers, means for operatively associating such means with the registers during predetermined intervals, and means for connecting such registers to the driving means, such counter adapted to indicate the number of actuations of the connecting means during such intervals.

4. In an accounting system, the combination of a working register, a waste register, a counter, means for driving such registers, means for operatively associating such means with the registers during predetermined intervals, and means for connecting such registers to the driving means, such counter adapted to indicate the number of actuations of the connecting means during such intervals, actuation of the connecting means outside of such predetermined intervals having no effect upon such counter.

5. In an accounting system, the combination of an electromagnetically operated register, a counter, a source of electric energy, a switch for closing one break in the operating circuit from such source through such register, and time-controlled mechanism for closing a second break in such operating circuit during predetermined intervals, such counter adapted to indicate the number of actuations of the switch during such intervals to close such operating circuit.

6. In an accounting system, the combination of an electromagnetically operated register, a counter, a source of electric energy, a switch for closing one break in the operating circuit from such source through such register, and time-controlled mechanism for closing a second break in such operating circuit during predetermined intervals, such counter adapted to indicate the number of actuations of the switch during such intervals to close such operative circuit, actuation of such switch outside of such predetermined intervals having no effect upon such counter.

7. In an accounting system, the combination of an electromagnetically operated working register, an electromagnetically operated waste register, a counter, a source of electric energy, a switch for closing one break in each of the operating circuits from such source through such registers, and time-controlled mechanism for closing a second break in such operating circuits during predetermined intervals, such counter adapted to indicate the number of actuations of the switch to close such operating circuits during such intervals.

8. In an accounting system, the combination of an electromagnetically operated working register, an electromagnetically operated waste register, a counter, a source of electric energy, a switch for closing one break in each of the operating circuits from such source through such registers, and time-controlled mechanism for closing a second break in such operating circuits during predetermined intervals, such counter adapted to indicate the number of actuations of the switch to close such operating circuits during such intervals, actuation of the switch outside of such predetermined intervals having no effect upon such counter.

9. In an accounting system, the combination of an electromagnetically operated register, a counter, a source of electric energy, a switch for closing one break in the operating circuit from such source through such register, time-controlled mechanism for closing a second break in such operating circuit during predetermined intervals, such counter adapted to indicate the number of actuations of the switch during such intervals to close such operating circuit, and a commutator in such circuit for sending periodic current impulses therethrough to operate such register.

10. In an accounting system, the combination of an electromagnetically operated register, a counter, a source of electric energy, a switch for closing one break in the operating circuit from such source through such register, time-controlled mechanism for closing a second break in such operating circuit during predetermined intervals, such counter adapted to indicate the number of actuations of the switch during such intervals to close such operating circuit, actuation of such switch outside of such predetermined intervals having no effect upon such counter, and a commutator in such circuit for sending periodic impulses therethrough to operate such register.

11. In an accounting system, the combination of an electromagnetically operated working register, an electromagnetically operated waste register, a counter, a source of electric energy, a switch for closing one break in each of the operating circuits from such source through such registers, time-controlled mechanism for closing a second break in such operating circuits during predetermined intervals, such counter adapted to indicate the number of actuations of the switch to close such operating circuits during such intervals, and a commutator in such circuit for sending periodic current impulses therethrough to operate such registers.

12. In an accounting system, the combination of an electromagnetically operated working register, an electromagnetically operated waste register, a counter, a source of electric energy, a switch for closing one break in each of the operating circuits from such source through such registers, time-controlled mechanism for closing a second break in such operating circuits during predetermined intervals, such counter adapted to indicate the number of actuations of the switch to close such operating circuits during such intervals, actuation of the switch outside of such predetermined intervals having no effect upon such counter, and a commutator in such circuit for sending periodic current impulses therethrough to operate such registers.

13. In a registering system, the combination of a waste register, a counter, means for driving such register, and means for disconnecting such register from the driving means, and a device actuated directly by the disconnecting means for causing such counter to indicate the number of disconnections thus made.

14. In a registering system, the combination of a working register, a waste register, a counter, means for driving such registers, and means for operatively connecting the working register to and for disconnecting the waste register from the driving means, such counter adapted to indicate the number of connections and disconnections thus made.

15. In a registering system, the combination of an electromagnetically operated waste register, a counter, a source of electric energy, and a switch for opening the operating circuit from such source through such register, such counter adapted to indicate only the number of operations of the switch to disconnect the register.

16. In a registering system, the combination of an electromagnetically operated working register, an electromagnetically operated waste register, a counter, a source of electric energy, and a switch for closing an operating circuit from such source through the working register and for opening the operating circuit through the waste register, such counter adapted to indicate the number of effective operations of such switch.

17. In a registering system, the combination of a waste register, a counter, means for driving such register, and means for actuating such counter each time the register is disconnected from the driving means.

18. In a registering system, the combination of a working register, a waste register, a counter, means for driving such registers, and means for actuating such counter upon each disconnection of the waste register from and the connection of the working register to such driving means.

19. In an accounting system, the combination of a register, a counter, means for driving such register, time-controlled mechanism for establishing operative periods for such driving means, and means for actuating such counter each time the register is connected to such driving means during such operative periods.

20. In an accounting system, the combination of a register, a counter, means for driving such register, time-controlled mechanism for establishing operative periods for such driving means, and means for actuating such counter each time the register is connected to such driving means during such operative periods, such counter being inoperative during intervals not included in such operative periods.

21. In an accounting system, the combination of a waste register, a counter, means for driving such register, time-controlled mechanism for establishing operative periods for such driving means, and means for actuating such counter each time the register is disconnected from such driving means during such operative periods.

22. In an accounting system the combination of a waste register, a counter, means for driving such register, time-controlled mechanism for establishing operative periods for such driving means, and means for actuating such counter each time the register is disconnected from such driving means during such operative periods, such counter being inoperative during intervals not included in such operative periods.

23. In an accounting system, the combination of a working register, a waste register, a counter, means for driving such registers, time-controlled mechanism for establishing operative periods for such driving means, and means for actuating such counter each time the working register is connected to and the waste register is disconnected from such driving means during such operative periods.

24. In an accounting system, the combination of a working register, a waste register, a counter, means for driving such registers, time-controlled mechanism for establishing operative periods for such driving means, and means for actuating such counter each time the working register is connected to and the waste register is disconnected from such driving means during such operative periods, such counter being inoperative during intervals not included in such operative periods.

25. In an accounting system, the combination of a register, a counter, means for driving such register, means for operatively associating such driving means with the register only during predetermined intervals, and means for connecting such register to the driving means, such counter adapted to indicate the number of times the register is connected to and disconnected from the driving means.

26. In an accounting system, the combination of an electromagnetically operated register, a counter, a source of electric energy, a switch for closing one break in the operating circuit from such source through such register, and time-controlled mechanism for closing a second break in such operating circuit during predetermined intervals, such counter adapted to indicate the number of connections and disconnections effected by such switch during such intervals.

27. In an accounting system, the combination of an electromagnetically operated register, a counter, a source of electric energy, a switch for closing one break in the operating circuit from such source through such register, time-controlled mechanism for closing a second break in such operating circuit during predetermined intervals, such counter adapted to indicate the number of connections and disconnections effected by such switch during such intervals, and a commutator in such circuit for sending periodic current impulses therethrough to operate such register.

28. In a registering system, the combination of a register, a counter, means for driving such register, and means for operatively connecting such register to and for disconnecting the same from the driving means, such counter adapted to indicate the total number of connections plus the total number of disconnections thus made.

29. In a registering system, the combination of a register, a counter, means for driving such register, and means for actuating such counter each time the register is operatively connected to or disconnected from the driving means.

30. In an accounting system, the combination of a time register, a counter, means for driving such register, time-controlled mechanism for establishing operative periods for such driving means, and means for actuating such counter each time the register is connected to or disconnected from such driving means during such operative periods.

31. In an accounting system, the combination of a plurality of registers, a counter associated with each register, means for driving such registers, means for operatively associating such driving means with the registers during predetermined intervals, means for connecting any desired register with the driving means, each counter adapted to indicate the number of actuations of the connecting means to connect the corresponding register during such intervals, a register for indicating the sum of the actuations of the first named registers, and means for indicating the total number of connections of such registers to the driving means.

32. In an accounting system, the combination of a plurality of electromagnetically operated registers, a counter associated with each register, a source of electric energy, a switch associated with each register for closing one break in its operating circuit, time-controlled mechanism for closing a second break in each of such circuits during predetermined intervals, each counter adapted to indicate the number of actuations of the associated switch during such intervals, a register for indicating the sum of the actuations of the first named registers, and means for indicating the total number of actuations of such switches.

33. In an accounting system, the combination of a plurality of electromagnetically operated registers, a counter associated with each register, a source of electric energy, a switch associated with each register for closing one break in its operating circuit, time-controlled mechanism for closing a second break in each of such circuits during predetermined intervals, each counter adapted to indicate the number of actuations of the associated switch during such intervals, a register for indicating the sum of the actuations of the first named registers, means for indicating the total number of actuations of such switches, and a commutator in such circuits for sending periodic current impulses therethrough to operate such registers.

34. In a registering system, the combination of a plurality of registers, a counter associated with each register, means for driving such registers, means for operatively connecting any one of such registers to the driving means, each counter adapted to indicate the number of connections effected between the corresponding register and the driving means, a register for indicating the sum of the actuations of the first named registers, and means for indicating the total number of connections of such registers to the driving means.

35. In a registering system, the combination of a plurality of electromagnetically operated registers, a counter associated with each register, a source of electric energy, a switch associated with each register for closing an operating circuit therefor, each counter adapted to indicate the number of closures effected by the corresponding switch, a register for indicating the sum of the actuations of the first named registers, and means for indicating the total number of connections effected by such switches.

36. In a registering system, the combination of a plurality of registers, a counter associated with each register, means for driving such registers, means for actuating each counter each time the corresponding register is operatively connected to the driving means, a register for indicating the sum of the actuations of the first named registers, and means for indicating the total number of connections of such registers to the driving means.

37. In an accounting system, the combination of a plurality of time registers, a counter associated with each register, means for driving such registers, time-controlled mechanism for establishing operative periods for such driving means, means for actuating each counter each time the corresponding register is connected to the driving means during such operative periods, a register for indicating the sum of the actuations of the time registers, and means for indicating the total number of connections of such registers to the driving means.

38. In an accounting system, the combination of a time register, a counter, means for driving such register, means for operatively associating such driving means with the register only during predetermined time intervals, and means for connecting such register to the driving means, such counter adapted to indicate the number of actuations of the connecting means during such time intervals.

39. In an accounting system, the combination of a working time register, a waste time register, a counter, means for driving such registers, means for operatively associating such means with the registers during predetermined time intervals, and means for connecting such registers to the driving means, such counter adapted to indicate the number of actuations of the connecting means during such time intervals.

40. In an accounting system, the combination of an electromagnetically operated time register, a counter, a source of electric energy, a switch for closing one break in the operating circuit from such source through such register, and time-controlled mechanism for closing a second break in such operating circuit during predetermined time intervals, such counter adapted to indicate the number of actuations of the switch during such intervals to close such operating circuit.

41. In an accounting system, the combination of an electromagnetically operated working time register, an electromagnetically operated waste time register, a counter a source of electric energy, a switch for closing one break in each of the operating circuits from such source through such registers, and time-controlled mechanism for closing a second break in such operating circuits during predetermined time intervals, such counter adapted to indicate the number of actuations of the switch to close such operating circuits during such intervals.

42. In an accounting system, the combination of an electromagnetically operated time register, a counter, a source of electric energy, a switch for closing one break in the operating circuit from such source through such register, time-controlled mechanism for closing a second break in such operating circuit during predetermined time intervals, such counter adapted to indicate the number of actuations of the switch during such intervals to close such operating circuit, and a commutator in such circuit for sending periodic current impulses therethrough to operate such register.

43. In an accounting system, the combination of an electromagnetically operated working time register, an electromagnetically operated waste time register, a counter, a source of electric energy, a switch for closing one break in each of the operating circuits from such source through such registers, time-controlled mechanism for closing a second break in such operating circuits during predetermined time intervals, such counter adapted to indicate the number of actuations of the switch to close such operating circuits during such intervals, and a commutator in such circuit for sending periodic current impulses therethrough to operate such registers.

44. In an accounting system, the combination of a waste time register, a counter, means for driving such register, and means for disconnecting such register from the driving means, such counter adapted to indicate the number of disconnections thus made.

45. In an accounting system, the combination of a working time register, a waste time register, a counter, means for driving such registers, and means for operatively connecting the working time register to and for disconnecting the waste time register from the driving means, such counter adapted to indicate the number of connections and disconnections thus made.

46. In an accounting system, the combination of a waste time register, a counter, means for driving such register, and means for actuating such counter each time the register is disconnected from the driving means.

47. In an accounting system, the combination of a time register, a counter, means for driving such register, time-controlled mechanism for establishing operative periods for such driving means, and means for actuating such counter each time the register is connected to such driving means during such operative periods.

48. In an accounting system, the combination of a waste time register, a counter, means for driving such register, time-controlled mechanism for establishing operative periods for such driving means, and means for actuating such counter each time the register is disconnected from such driving means during such operative periods.

49. In an accounting system, the combination of a time register, a counter, means for driving such register, means for operatively associating such driving means with the register only during predetermined time intervals, and means for connecting such register to the driving means, such counter adapted to indicate the number of times the register is connected to and disconnected from the driving means.

50. In an accounting system, the combination of an electromagnetically operated time register, a counter, a source of electric energy, a switch for closing one break in the operating circuit from such source through such register, time-controlled mechanism for closing a second break in such operating circuit during predetermined time intervals, such counter adapted to indicate the number of connections and disconnections effected by such switch during such intervals, and a commutator in such circuit for sending periodic current impulses therethrough to operate such register.

51. In an accounting system, the combination of a time register, a counter, means for driving such register, and means for operatively connecting such register to and for disconnecting the same from the driving means, such counter adapted to indicate the total number of connections plus the total number of disconnections thus made.

52. In an accounting system, the combination of an electromagnetically operated time register, a counter, a source of electric energy, and a switch for closing an operating circuit from such source through such register, such counter adapted to indicate the number of connections and disconnections thus effected by such switch.

53. In an accounting system, the combination of a plurality of time registers, a counter associated with each register, means for driving such registers, means for operatively associating such driving means with the registers during predetermined time intervals, means for connecting any desired register with the driving means, each counter adapted to indicate the number of actuations of the connecting means to connect the corresponding register during such time intervals, a register for indicating the sum of the actuations of the time registers, and means for indicating the total number of connections of such registers to the driving means.

54. In an accounting system, the combination of a plurality of electromagnetically operated time registers, a counter associated with each register, a source of electric energy, a switch associated with each register for closing one break in its operating circuit, time-controlled mechanism for closing a second break in each of such circuits during predetermined time intervals, each counter adapted to indicate the number of actuations of the associated switch during such intervals, a register for indicating the sum of the actuations of the time registers, means for indicating the total number of actuations of such switches, and a commutator in such circuits for sending periodic current impulses therethrough to operate such registers.

55. In an accounting system, the combination of a plurality of time registers, a counter associated with each register, means for driving such registers, means for operatively connecting any one of such registers to the driving means, each counter adapted to indicate the number of connections effected between the corresponding time register and the driving means, a register for indicating the sum of the actuations of the time registers, and means for indicating the total number of connections of such registers to the driving means.

56. In an accounting system, the combination of a plurality of time registers, a counter associated with each register, means for driving such registers, means for actuating each counter each time the corresponding register is operatively connected to the driving means, a register for indicating the sum of the actuations of the time registers, and means for indicating the total number of connections of such registers to the driving means.

57. In a registering system, the combination of a register, a counter, means operative during predetermined intervals for actuating such register, and means for connecting such register to the actuating means, such counter actuated to indicate the number of operative connections or the total number of connections made by such connecting means, as desired.

58. In a registering system, the combination of a register, means for actuating such register, means for disconnecting such register from the actuating means, and means separate from the register for registering the number of disconnections effected by such disconnecting means.

59. In a registering system, the combination of a register, means for actuating such register, means for connecting such register to and disconnecting the same from such actuating means, and means separate from the register for registering the total number of connections and disconnections effected by such connecting and disconnecting means.

60. In a registering system, the combination of a register, means operative only during predetermined intervals for actuating such register, means for connecting such register to the actuating means, and means separate from the register for registering the number of connections effected by such connecting means during such intervals.

61. In a registering system, the combination of a register, means operative only during predetermined intervals for actuating such register, means for disconnecting such register from the actuating means, and means separate from the register for registering the number of disconnections effected by such disconnecting means during such intervals.

62. In a registering system, the combination of a register, means operative only during predetermined intervals for actuating such register, means for connecting such register to and disconnecting such register from the actuating means, and means separate from the register for registering the number of connections and disconnections effected by such connecting and disconnecting means during such intervals.

63. In a registering system, the combination of a register, means operative only during predetermined intervals for actuating such register, means for connecting such register to the actuating means, means separate from the register for registering the number of connections effected by such connecting means during such intervals, and means for registering the total number of connections effected by such connecting means.

64. In a registering system, the combination of a register, means operative only during predetermined intervals for actuating such register, means for disconnecting such register from the actuating means, means separate from the register for registering the number of disconnections effected by such disconnecting means during such intervals, and means for registering the total number of disconnections effected by such disconnecting means.

65. In a registering system, the combination of a register, means operative only during predetermined intervals for actuating such register, means for connecting such register to and disconnecting such register from the actuating means, means separate from the register for registering the number of connections and disconnections effected by such connecting and disconnecting means during such intervals, and means for registering the total number of connections and disconnections effected by such connecting and disconnecting means.

66. In a registering system, the combination of two registers, means for actuating such registers, a device for connecting either of such registers to the actuating means, as desired, and means for registering the number of connections effected by such device with one of such registers.

67. In a registering system, the combination of two registers, means for actuating such registers, means for connecting either of such registers to and for disconnecting either of such registers from the actuating means as desired, and means for registering the number of connections effected with one of such registers and disconnections effected with the other of such registers by the disconnection of the connecting means.

68. In a registering system, the combination of two registers, means for actuating such registers, means for connecting either of such registers to the actuating means as desired, and a device for registering the number of connections effected by such connecting means with both of such registers.

69. In a registering system, the combination of two registers, means for actuating such registers, means for connecting either of such registers to the actuating means as desired, means for registering the number of connections effected by such connecting means with any one of such registers, and means for registering the total number of actuations of such connecting means.

70. In a registering system, the combination of two registers, means for actuating such registers, means for connecting either of such registers to and for disconnecting either of such registers from the actuating means as desired, means for registering the number of connections effected with one of such registers and disconnections effected with the other of such registers by the disconnection of the connecting means, and means for registering the total number of actuations of such connecting and disconnecting means.

71. In a registering system, the combination of two registers, means for actuating such registers, means for connecting either of such registers to the actuating means as desired, means for registering the number of connections effected by such connecting means with either of such registers without registering the connections effected with the other register, and means for registering the total number of actuations of such connecting and disconnecting means.

72. In a registering system, the combination of two registers, means operative only during predetermined intervals for actuating such registers, means for connecting either of such registers to the actuating means as desired, means for registering the number of connections effected by such connecting means with one of such registers during such intervals, and means for registering the total number of actuations of such connecting means.

73. In a registering system, the combination of two registers, means operative only during predetermined intervals for actuating such registers, means for connecting either of such registers to and for disconnecting either of such registers from the actuating means as desired, means for registering the number of connections effected with one of such registers and disconnections effected from the other of such registers by such connecting and disconnecting means during such intervals, and means for registering the total number of actuations of such connecting and disconnecting means.

74. In a registering system, the combination of two registers, means operative only during predetermined intervals for actuating such registers, means for connecting either of such registers to the actuating means as desired, means for registering the number of connections effected by such connecting means with either of such registers without registering the connections effected with the other register during such intervals, and means for registering the total number of actuations of such connecting means.

75. In a registering system, the combination of two registers, means operative only during predetermined intervals for actuating such registers, means for connecting either of such registers to the actuating means as desired, means for registering the number of connections effected by such connecting means with both of such registers during such intervals, and means for registering the total number of actuations of such connecting means.

76. In combination, two registers, an independent operating circuit for each register, a switch for closing either circuit as desired, and means for indicating the number of closures of one of such circuits.

In witness whereof, I hereunto subscribe my name this 13th day of May A. D. 1909.

WILLIAM J. CRUMPTON.

Witnesses:
ALBERT C. BELL,
LEONARD W. NOVANDER.